United States Patent Office 3,545,994
Patented Dec. 8, 1970

3,545,994
PROCESS FOR COATING PIGMENTARY METAL OXIDES
Harry Lott, Jr., and Robert H. Walsh, Akron, Ohio, assignors to PPG Industries, Inc., Pittsburgh, Pa., a corporation of Pennsylvania
No Drawing. Continuation-in-part of application Ser. No. 491,447, Sept. 29, 1965. This application Nov. 7, 1969, Ser. No. 874,970
Int. Cl. C08h *17/00;* C09c *1/00, 3/00*
U.S. Cl. 106—308
14 Claims

ABSTRACT OF THE DISCLOSURE

Pigmentary metal oxides, e.g., titanium dioxide are coated while in aqueous slurry with hydrous metal oxides, e.g., hydrous oxides of titanium, aluminum and silicon. Homogeneous coatings are obtained by adjusting the slurry pH with a weak acid or weak base which is generated in situ. The hydrolysis of urea to generate a weak acid or weak base is described.

CROSS-REFERENCE TO RELATED APPLICATIONS

This application is a continuation-in-part application of our application Ser. No. 491,447, filed Sept. 29, 1965 and now abandoned.

BACKGROUND OF THE INVENTION

It is customary in the production of pigmentary metal oxides, e.g., titanium dioxide, to subject the pigment to various finishing treatments in order to impart desired stabilization thereto or improve the color, texture, oil absorption and other desired characteristics of the pigment. One such finishing treatment comprises coating the surface of the pigment with one or more hydrous metal oxides. The application of such a hydrous metal oxide coating is accomplished by techniques well known in the pigment industry and typically comprises preparing an aqueous slurry of the pigment, adding hydrolyzable metal compound thereto, neutralizing the slurry to coat the pigment with the hydrolysis product of the hydrolyzable metal compound and recovering the coated pigment.

It has been suggested that the application of hydrous metal oxide coatings to the surface of pigmentary metal oxides, such as titanium dioxide, is performed to mask highly active sites that are present on the surface of the pigment and that tend to react with organic vehicles into which the pigment is incorporated. In order to properly mask the surface of the pigment, the coating should be homogeneous about the surface of the pigment and relatively dense so that the coating is not removed in subsequent processing, e.g., fluid energy milling.

Typically, relatively strong acids, bases and acidic and basic salts are used to neutralize the aqueous pigment slurry and to precipitate the hydrous metal oxide coatings onto the surface of the pigment. When such reagents are used, there are created local strong concentrations of acidic or basic ions at the point of introduction into the slurry. Such localized concentrations result in non-homogeneous precipitation of the hydrous metal oxide coating onto the surface of the pigment. In addition, the hydrous metal oxide coating on the surface of the pigment is in a gelatinous rather than a dense form, i.e., a given amount of gelatinous hydrous metal oxide coating occupies a substantially larger volume than the same amount of hydrous metal oxide precipitated in a dense form. The reason that relatively strong acids, bases and salts thereof produce the localized imbalance of acidic and basic ions is that these materials ionize completely and immediately upon addition to the aqueous slurry. Examples of such materials include: mineral acids such as nitric acid, hydrochloric acid and sulfuric acid; bases such as sodium hydroxide, potassium hydroxide and amines; and the salts of strong bases and weak acids and the salts of strong acids and weak bases, e.g., sodium carbonate, potassium bicarbonate, sodium sulfate and magnesium sulfate. In some cases, salts of a weak acid and weak base, e.g., ammonium carbonate, also produce an imbalance of ions in the aqueous slurry for the reason that such salts ionize and effervesce instantly upon admixture with the aqueous slurry. Thus, a wet coating process which avoids the aforementioned localized imbalance of anions or cations and produces a homogeneous, dense coating of hydrous metal oxide on the pigment surface is desirable.

BRIEF SUMMARY OF THE INVENTION

It has now been discovered that pigmentary metal oxides, e.g., titanium dioxide, having a homogeneous hydrous metal oxide coating can be obtained by slowly adjusting the pH of the pigment slurry, i.e., neutralizing an aqueous slurry containing the pigmentary metal oxide and hydrolyzable metal coating compound by generating in situ a member selected from the group consisting of a weak acid and a weak base.

DETAILED DESCRIPTION

The present invention relates to an improved method for wet coating pigmentary metal oxides, particularly white pigmentary metal oxides such as titanium dioxide. In particular, this invention relates to the use of a weak acid or base, which is generated in situ to neutralize an aqueous slurry of pigmentary metal oxides during deposition of hydrous metal oxides upon the surface of said pigment. Since the method described hereinafter is directed to the neutralization of an aqueous pigment slurry, it is applicable to any pigmentary metal oxide upon which hydrous metal oxide coatings are placed. However, for purposes of simplicity and brevity, the present discussion will be limited to titanium dioxide, which is, at present, the chief whie pigment of commerce.

As used herein, the term "metal oxide" is intended to mean and include the so-called metalloid oxides. Examples of metal oxides to which the process of the present invention can be applied include the oxides of aluminum, arsenic, beryllium, boron, cadmium, gadolinium, germanium, hafnium, lanthanum, iron, nickel, samarium, scandium, silicon, strontium, tantalum, tellurium, terbium, thorium, thulium, tin, titanium, ytterium, ytterbium, zinc, zirconium, niobium, gallium, antimony and lead. Particularly preferred are the oxides of aluminum, boron, cobalt, nickel, iron, silicon, tin, titanium, zinc, zirconium, antimony and lead.

Titanium dioxide pigment is produced commercially by at least two different manufacturing processes. One such process is known as the "sufate or acid" process. In the sulfate process, a titaniferous ore, such as ilmenite, is digested with sulfuric acid to form a digest cake. The cake is dissolved in an aqueous medium to form a sulfate solution which, after clarification and concentration, is hydrolyzed to precipitate an insoluble titanium oxide hydrolysate. The hydrolysate is filtered, washed and calcined at temperatures ranging between 800° C. and 1200° C. or higher to develop the pigmentary properties of the pigment. Such pigment is often referred to as "sulfate pigment" or "calcined titanium dioxide." See, for example, U.S. Patents 2,253,551, 2,505,344, 2,766,133, 2,933,408, 2,982,613, 3,062,673 and 3,330,798.

Another and more recent process developed for preparing pigmentary titanium dioxide is that of the vapor phase reaction of a titanium halide, such as titanium tetrahalide. Typically, this method involves reacting vaporous titanium halide, e.g., titanium trichloride or a titanium tetrahalide selected from the group consisting of titanium tetrachloride, titanium tetrabromide and titanium tetraiodide with oxygen and/or water vapor in a reaction zone at elevated temperatures. Titanium tetrafluoride is generally considered not useful for the oxidation process. For the oxidation reaction, reaction temperatures usually range between about 800° C. and about 1200° C. Vapor phase hydrolysis temperatures usually range from 300° C. to 400° C. Pigment prepared by the aforementioned process is often referred to as "chloride process pigment."

Typical vapor phase reaction processes are described in U.S. Letters Patent 2,450,156 to Pechukas, 2,502,347 to Schaumann, 2,791,490 to Willcox, 2,823,982 to Saladin et al., 2,937,928 to Hughes et al., 2,968,529 to Wilson, 3,068,113 to Strain et al., 3,069,281 to Wilson, British Patent 876,672 and Canadian Patent 662,785. Likewise, the vapor phase reaction may be conducted in the presence of a fluidized bed as disclosed in U.S. Letters Patent 2,760,846 to Richmond, 2,856,264 to Dunn, Jr., 2,964,386 to Evans et al., and 3,073,712 to Wigginton, et al.

In accordance with the practice of this invention, the pH of an aqueous slurry containing pigment and at least one hydrolyzable metal compound (from which the hydrous metal oxide is derived) is gradually and homogeneously adjusted by generating a weak acid or a weak base in situ such that a dense, uniform coating of at least one hydrous metal oxide is uniformly and homogeneously precipitated upon the surface of the slurried raw pigment. Generally, the pH adjustment comprises neutralizing the slurry from an acidic or basic pH to a relatively neutral pH of from about 6.5 to 7.5.

More particularly, an aqueous slurry of raw (chemically untreated) titanium dioxide pigment, usually at ambient temperature, i.e., about 20° C., which contains at least one hydrolyzable metal coating compound and a compound that will substantialy hydrolyze at temperature above the slurry temperature to generate an acid or base in situ within the slurry is prepared. Preferably, the hydrolyzable metal compound is water soluble. The slurry is then slowly heated to an elevated temperature, e.g., 60–100° C., preferably, 80–100° C., so as to gradually generate the acid or base in situ, thereby gradually adjusting the slurry pH. As the slurry is neutralized, the hydrolyzable metal compound completely hydrolyzes and precipitates as a hydrous metal oxide coating on the pigment.

By slowly generating the acid or base in situ within the slurry, high localized concentrations of acidic or basic ions are avoided, and the metal compound is gradually hydrolyzed such that a homogeneous, dense, hydrous metal oxide coating is uniformly precipitated upon the surface of the pigment.

In a preferred embodiment of this invention, raw titanium dioxide is recovered from a vapor phase reaction zone and slurried in water at ambient temperature, e.g., 20–25° C. Typically, the aqueous slurry has a pH of less than 4.5, usually from about 1.0 to about 4.0, and usually comprises from 5 to 60 weight percent, more usually 10 to 30 weight percent of pigment. There is incorporated in the slurry at least one water soluble hydrolyzable metal coating compound and a compound that will hydrolyze under acid conditions to generate a weak base in situ at temperatures above the ambient temperature of the slurry. The slurry is then heated slowly from ambient temperature to an elevated temperature, e.g., 80° C. or above, so as to generate base in situ and uniformly increase the slurry pH toward neutral. As the slurry pH and temperature gradually increase, the water soluble metal compound is slowly and completely hydrolyzed and hydrous metal oxide is uniformly precipitated upon the raw pigment.

The length of time used to heat the slurry from an ambient to an elevated temperature can vary and will depend to a great extent on the hydrolysis constant of the compound used to generate the weak acid or weak base. Typically from about 1 to about 4 hours or more has been found to be adequate.

In still another embodiment, a titanium dioxide pigment slurry at ambient temperature is adjusted to a basic pH, e.g., from about 8.5 to about 12.5, usually above 10.0, and there is incorporated into the slurry at least one water soluble hydrolyzable metal coating compound and a compound that will hydrolyze to generate a weak acid in situ. The slurry is slowly heated from ambient temperature to an elevated temperature, e.g., 80 to 100° C., so as to generate acid in situ and uniformly decrease the slurry pH to substantially neutral. As the slurry temperature is increased and the pH is gradually decreased, the water soluble, hydrolyzable metal compound is slowly and completely hydrolyzed and hydrous metal oxide is homogeneously precipitated upon the raw pigment.

In the practice of this invention, there may be incorporated in the slurry a compound such as urea which hydrolyzes to generate either a weak acid under alkaline conditions or a weak base under acidic conditions. When urea is hydrolyzed, there is generated both carbon dioxide and ammonia. When the slurry is at an acidic pH and an elevated temperature, the $CO_2$ is passed off as a gas and the ammonia forms $NH_4OH$. However, when the slurry is at a basic pH, the $CO_2$ forms $H_2CO_3$ and the $NH_3$ passes out of the slurry as a gas. Urea is especially suitable because at ambient temperatures, e.g., about 20° C., the rate of hydrolysis is very slow. Thus, the weak acid or weak base can be generated in situ by simply heating the slurry to temperatures at which the rate of hydrolysis becomes significant.

The following equations are illustrative of the aforementioned urea hydrolysis in the pigment slurry.

Acid slurry

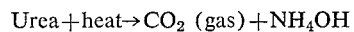

Urea+heat→$CO_2$ (gas)+$NH_4OH$

Alkaline slurry

Urea+heat→$H_2CO_3$+$NH_3$ (gas)

It is contemplated that hydrolyzable compounds other than urea that generate a weak base in situ so as to gradually raise the pH of an acid slurry of pigment can be used. Typical compounds that generate weak bases in an acid slurry include, not by way of limitation, the amides, substituted amides, imides, substituted imides, and derivatives thereof, particularly acetamide ($CH_3CONH_2$).

Likewise, it is contemplated that hydrolyzable compounds other than urea that generate a weak acid in an aqueous pigment slurry having an alkaline pH (so as to lower the slurry pH) can be used.

The rate of change of slurry pH as a result of the in situ generation of a weak acid or weak base will be a function of the rate of hydrolysis of the compound which generates the weak acid or weak base and the concentration of the compound in the slurry. Typically, the hydrolysis constant ($Kh$) of that compound should be less than about 0.5 and, preferably, is from about 0.1 to about 0.5. The use of a compound with a relatively low hydrolysis constant insures that the weak acid or weak base generated in situ is generated slowly so that the rate of change of pH with time, $d\ pH/dt$, is substantially uniform. As used herein, a weak acid or weak base is considered to be an acid or base having an ionization constant of less than $1 \times 10^{-4}$.

In accordance with the present process, the slurry pH is adjusted gradually and substantially uniformly over a period of at least 45 minutes, usually from 1 to 10 hours, and preferably from about 2 to 6 hours in order to insure the gradual hydrolysis and precipitation of hydrous metal oxide upon the surface of the pigment. Typically, the incremental rate of change of pH with time in hours ($d\ pH/dt$) ranges from about 0.35 to about 2.0, preferably from about 0.5 to 1.5.

The amount of compound which generates the weak acid or weak base, e.g., urea, that is used will depend on the extent of the pH adjustment desired. Typically, enough is used to completely neutralize all the available anions or cations present in the slurry, i.e., at least a stoichiometric amount. Usually greater than stoichiometric amounts, e.g., 2 to 10 times the stoichiometric amount, is used in order to increase the amount of weak acid or weak base generated in a given time.

In accordance with the practice of this invention, any water soluble, hydrolyzable metal compound that yields a hydrous oxide upon hydrolysis can be incorporated into the pigment slurry to precipitate at least one hydrous oxide coating upon the pigment. Hydrous metal oxide as used herein is defined as including hydrous metal hydroxide and/or hydrated metal oxide. These metal compounds are well known in the pigment industry.

Particular hydrous metal oxide coatings that can be used in accordance with the practice of this invention include, not by way of limitation, the hydrous oxides of titanium, zirconium, aluminum, magnesium, zinc, cadmium, iron, manganese, arsenic, antimony, vanadium, niobium, tantalum, chromium, molybdenum, tungsten, scandium, yttrium, lanthanum, cerium, thorium (and the other rare earths of the Actinium and Lanthanide Series), silicon, tin and lead. More typically, hydrous metal oxide coatings of titanium, zirconium, aluminum, magnesium, zinc, manganese, antimony and cerium are used.

Hydrolyzable metal compounds contemplated in the practice of this invention include: the organic and inorganic halides (e.g., chlorides, bromides, iodides and fluorides), oxyhalides (particularly the oxychlorides and oxybromides), nitrates, nitrites, nitrides, sulfates, sulfites, sulfides, oxynitrates, oxysulfates, carbides, carbonates, phosphates, phosphides, phosphites, boratese, perborates, perhalogenates (e.g., perchlorides, perbromates, periodates, perfluorates), persulfates and pernitrates of the aforementioned metals.

Other contemplated organic compounds include, not by way of limitation, the hydrolyzable organometals such as the alkyls, alkenyls, alkynyls, aryls, arylalkyls, arylalkenyls, arylalkynyls, heterocyclics, thioalkyls, alkoxys, alkoxides, alkylether complexes, and derivatives thereof of the aforementioned metals. It is particularly beneficial to use an organometallic which, upon hydrolysis, forms (in addition to the hydrous metal oxide) an organic residue having a boiling point such that a substantial or major portion thereof will be volatilized under the operating conditions of the stream.

Typical hydrolyzable titanium compounds contemplated in the practice of this invention comprise both organic and inorganic compounds and include, not by way of limitation, $TiCl_4$, $TiBr_4$, $TiI_4$, titanyl sulfate, titanium sulfate, titanium esters such as tetraethyl titanate, tetra-2-chloroethyl titanate, tetraoctyl titanate, tetraphenoxy titanium, and alkali metal titanates, e.g., lithium, sodium and poassium titanates. Likewise, tetraacyloxy titanium compounds such as tetraacetyl titanium and tetrabutyric titanium can be employed.

Typical hydrolyzable zirconium compounds contemplated in the practice of this invention comprise both organic and inorganic compounds and include, not by way of limitation, $ZrCl_4$, $ZrCl_3$, $ZrBr_4$, $ZrBr_3$, $ZrBr_2$, $ZrI_4$ and organic compounds similar to the titanium compounds listed hereinbefore.

Typical hydrolyzable aluminum compounds contemplated include, not by way of limitation, organic and inorganic compounds similar to those listed for titanium hereinbefore, such as $AlCl_3$, $AlF_3$, $AlBr_3$, $AlI_3$, $AlCl$, $AlF$, $AlBr$, $AlI$, $Al_2Cl_6$, sodium aluminate, aluminum sulfate, alkyl and aryl aluminum such as triethyl aluminum, trihexyl aluminum and triphenyl aluminum, aluminum triacetate, aluminum diacetate and aluminum benzoate. Likewise, alkoxy and aryloxy aluminum such as triethoxy aluminum, tributoxy aluminum and triphenoxy aluminum can be employed.

Typical hydrolyzable magnesium compounds include: $Mg(CH_3)_2$, diethyl magnesium, dibutyl magnesium, dicyclopentadienyl magnesium, dibenzyl magnesium, ditrityl magnesium, $MgCl_2$, $MgBr_2$, $MgI_2$, $MgF_2$, magnesium orthoborate, magnesium sulfide, magnesium sulfate and the Grignard Reagents, such as $C_2H_5MgBr$.

Typical hydrolyzable zinc compounds contemplated in the practice of this invention include: zinc amide, zinc butyrate, zinc citrate, zinc fluoride, zinc chloride, zinc bromide, zinc iodide, zinc fluorosilicate, zinc formate, zinc nitrate, zinc nitride, zinc sulfite and diethyl zinc.

Typical hydrolyzable cadmium compounds include, not by way of limitation, cadmium acetate, cadmium formate, $CdI_2$, $CdCl_2$, $CdBr_2$, $CdF_2$, cadmium sulfate, dimethyl cadmium, diethyl cadmium, di-n-propyl cadmium, di-n-butyl cadmium, and di-i-amyl cadmium.

Typical hydrolyzable iron compounds include, not by way of limitation, iron acetate, iron bromide, iron chloride, iron iodide, iron fluoride, iron fluosilicate, iron sulfate and hydrates thereof, carbonyls of iron, and iron thiosulfate.

Typical hydrolyzable compounds of manganese include, not by way of limitation, manganese acetate, manganese monoboride, manganese dibromide, manganese dichloride, manganese difluoride, manganese diiodide, manganese sulfates, particularly $Mn_2(SO_4)_3$, and manganese thiocyanate.

Examples of suitable silicon compounds include: silicic acid, $SiCl_4$, $SiBr_4$, $SiI_4$, $SiH_4$, $Si(OOCCH_3)_4$, $Si(NH_2)_2$, $Si(NH_2)_4$, $Si(OCH_2CH_3)_4$ and alkali metal silicates, e.g., sodium silicate, or other such hydrolyzable silicon compounds.

Suitable combinations of inorganic hydrolyzable compounds include the sulfates and halides, e.g., $AlCl_3$ and $TiCl_4$; aluminum sulfate and $TiCl_4$; $AlCl_3$ and titanium sulfate; $SiCl_4$, $TiCl_4$ and $AlCl_3$; $SiCl_4$, titanium sulfate, and $AlCl_3$; $SiCl_4$, $TiCl_4$ and aluminum sulfate; $SiCl_4$, titanium sulfate and aluminum sulfate. It is contemplated that the sulfates and halides of the other metals can be added to, or substituted for, the suitable combinations listed. It is particularly contemplated that the metal sulfates and/or halides be used to precipitate the contemplated combinations of hydrous metal oxide coatings listed hereinbefore.

The pigmentary metal oxide, e.g., raw titanium oxide pigment, is coated with from about 0.05 to 15.0 percent by weight, preferably 0.1 to 5.0 percent total hydrous metal oxide, based on the weight of the raw pigment. When the pigment is coated with two or more hydrous oxides, the total amount of any one hydrous oxide usually does not exceed 10.0 percent by weight of the raw pigment, preferably less than 5.0 percent.

In some instances, there will be a limit on the extent of the pH adjustment capable with the weak acid or weak base because of their limited solubility in aqueous solutions at elevated temperatures. Thus, for example, the upper practical limit of pH adjustment with a weak base such as $NH_4OH$ is about 8.0 at a slurry temperature of 80 to 90° C.

Because of such limited solubility in water of certain weak acids and bases, particularly $CO_2$ and $NH_3$, it is contemplated that the slurry pH may be first adjusted with a weak acid or weak base generated in situ and then given a final pH adjustment by the addition of another acid or another base, preferably a strong acid or strong base.

When the slurry pH is adjusted with a weak acid or weak base that is generated in situ, a by-product gas, such as $NH_3$ or $CO_2$, may be generated and evolved from the slurry. In accordance with the practice of this invention, it is contemplated that such gas can be recovered.

It is further contemplated in the practice of this invention that the hydrolyzable weak acid or weak base generating compound be added separately or in conjunction with one or more hydrolyzable metal coating compound.

Hydrolysis of a metal compound that produces a hydrous metal oxide as used herein is defined as the reaction of the metal compound with water at any pH to form a hydrous metal oxide. It is thus intended to include acid, alkaline or neutral pH hydrolysis. Natural pH hydrolysis may also include a so-called neutralization reaction wherein a metal oxide is precipitated by the neutralization of an acid or alkaline slurry, e.g., the neutralization of a pigment slurry containing sodium aluminate from a pH of about 10.0 to a pH of less than 9.0 to precipitate hydrous aluminum oxide.

In accordance with the practice of this invention, raw titanium oxide pigment can be nonneutralized or neutralized before it is slurried in water. $TiO_2$ produced by the vapor phase oxidation of $TiCl_4$ usually contains some adsorbed chlorine gas and thus typically gives a pH of about 4.0 when slurried in water to a concentration of 10.0 to 30.0 percent by weight of the slurry. If such pigment is degassed or neutralized by heating or washing, it will give a substantially neutral pH, e.g., about 6.5–7.5.

Pigment which is treated in accordance with this invention characteristically has a homogeneous, more dense, hydrous coating with improved tint acceptance, improved dispersion, improved pKa and greater ease of washing.

Tint acceptance or efficiency as used herein refers to the reflectometry method disclosed on pages 704–715, volume 34, Journal of Paint Technology and Engineering, (Official Digest), July, 1962. In this method, a standard, common, commercial type of enamel paint is prepared out of a known amount of a standard pigment, vehicle and colorant (tint). An enamel paint is also prepared from a sample pigment and compared with the standard using a reflectometer.

Pigments treated in accordance with the embodiments of this invention typically have a tint efficiency of at least 98 percent, usually 100 percent, that of the standard, as measured with a reflectometer.

As noted hereinbefore, this invention also improves the pKa value of pigment surface.

The term pKa as used herein refers to the change of color of certain indicator dyes as the result of interaction with a solid surface, as disclosed by H. A. Benesi in his article, "Acidity of Catalyst Surfaces," published in the Journal of the American Chemical Society, 78, 5490 (1956).

pKa is a measure of the base strength of the indicator. If the base strength of the indicator is high, a weak acid or weak surface activity is necessary to cause a color change. A low base strength of the indicator requires a strong acid or strong surface activity to produce a color change.

The pKa of a pigment is an indirect measure of its wetting properties and its tendency to agglomerate, particularly in organic vehicles. It is highly desirable that titanium oxide pigment have a high positive pKa value and a neutral or low surface acidity.

The pKa scale as used herein is given in Table I.

TABLE I

| pKa range | Description | $H_2SO_4$ equivalent, percent by weight |
| --- | --- | --- |
| +6.8, +4.0 | Neutral | $8 \times 10^{-8}$ to $5 \times 10^{-6}$ |
| +4.0, +3.3 | Mildly acidic | $5 \times 10^{-6}$ to $3 \times 10^{-4}$ |
| +3.3, +1.5 | Acidic | $3 \times 10^{-4}$ to 0.02 |
| +1.5, −3.0 | Very acidic | 0.02 to 48 |
| −3.0, −5.6 | Extremely acidic | 48 to 71 |
| −5.6, −8.2 | Very extremely acidic | 71 to 90 |

The pKa range of 4.0 to 6.8 is thus written +6.8, +4.0. Typical pKa indicators are given in Table II.

TABLE II

| pKa | Indicator | Basic color | Acid color |
| --- | --- | --- | --- |
| +6.8 | Neutral red | Yellow | Red. |
| +4.0 | Phenylazonaphthylamine | do | Red. |
| +3.3 | Butter yellow | do | Red. |
| +1.5 | Benzeneazodiphenylamine | do | Purple. |
| −3.0 | Dicinnamalacetone | do | Red. |
| −5.6 | Benzalacetophenone | Colorless | Yellow. |
| −8.2 | Anthraquinone | do | Do. |

When raw titanium dioxide pigment is produced by the vapor phase oxidation of a titanium tetrahalide, such as $TiCl_4$, it has a highly acidic surface corresponding to a pKa value of less than −3.0. However, when such pigment is treated in accordance with the practice of this present invention, the pKa value of the treated pigment is increased to at least +4.0, +3.3, usually about +6.8, +4.0. Pigment coated with hydrous oxides in the usual manner, i.e., neutralization of the slurry with a strong acid, base or salt, typically has a pKa value of from +1.5, −3.0 to +3.3, +1.5.

The term "raw pigmentary titanium dioxide" is intended to mean and include pigmentary titanium dioxide, especially anatase and rutile titanium dioxide, that has had its basic pigmentary properties developed. Such a pigment includes "chloride process titanium dioxide" and "calcined titanium dioxide" produced by the sulfate process, as well as equivalent titanium dioxide produced by other less common techniques. Also included within the term "raw titanium dioxide pigment" are the aforementioned pigments which have been physically treated, for example, by milling, grinding, hydroseparation, filtration and degassing procedures.

"Raw pigmentary titanium dioxide" is to be distinguished from a "finished" titanium dioxide pigment which is defined herein as a raw pigment which has been given one or more inorganic and/or organic coatings. Thus, a raw pigment is one which has had the basic chemical composition of its surface substantially unaltered once its basic pigmentary properties have been developed; whereas, a "finished" pigment is a pigment which has had the chemical composition of its surface altered by the addition of a chemical coating to the surface of the pigment. An example of one such coating technique is found in U.S. Patent No. 3,146,119.

The tinting strength of raw pigment is significantly improved when coated with a hydrous oxide. Tinting strength can be determined in accordance with A.S.T.M. D–332–26, "1949 Book of A.S.T.M. Standards," part 4, page 31, published by American Society for Testing Material, Philadephia 3, Pa. The pigment oil absorption is also improved as determined by A.S.T.M. D–281–31.

The present process is more particularly described in the following examples which are intended as illustrative only since numerous modifications and variations therein will be apparent to those skilled in the art.

EXAMPLE I

Titanium terachloride ($TiCl_4$) is oxidized in the vapor phase with oxygen at about 1000° C. in the presence of aluminum trichloride ($AlCl_3$) and silicon tetrachloride ($SiCl_4$) to produce a raw titanium oxide pigment containing about 1.80±0.15 percent by weight $Al_2O_3$ and about 0.56±0.06 percent by weight $SiO_2$, based on the weight of the raw titanium dioxide pigment.

The raw pigment has a tinting strength of about 1670 and a mean particle size diameter of about 0.20 to 0.25 micron. The tint acceptance (or efficiency) of the pigment cannot be determined because the tint used floated to the surface of the panel.

One thousand (1,000) grams of the raw unneutralized pigment is slurried in 4.0 liters of deionized water at 28° C. to form an aqueous slurry containing about 20.0 percent by weight pigment based on the total weight of the slurry.

The slurry is adjusted with 25 percent by weight $H_2SO_4$ from a pH of about 4.1 to a pH of about 1.5. There is added 72 milliliters of aqueous $TiCl_4$ solution containing 247 grams of $TiCl_4$ per liter of solution.

The slurry is maintained at a pH of about 1.5 and a temperature of 28° C. for about 15 minutes. One hundred five (105) grams of $Al_2(SO_4)_3 \cdot 18H_2O$ (in aqueous solution) and two hundred forty (240) grams of urea are added together to the slurry.

The slurry is heated such that the temperature gradually increases in one hour from about 28° C. to about 71° C. and such that the slurry pH increases from 1.5 to 2.0.

The slurry is further heated such that the temperature gradually increases from about 71° C. to about 99° C. and the slurry pH increases from 2.0 to 3.3 in about one hour. The slurry is maintained at 99° C. for about one hour, during which time the slurry increases from 3.5 to 5.5.

The slurry pH is increased from 5.5 to 7.5 with a solution of 25 percent $Na_2CO_3$ and the slurry digested at one hour at about 100° C. The slurry is then filtered and the coated pigment filtrate washed with 18 displacements of water. The pigment is dried overnight at 60° C. and its properties evaluated.

The pigment has a tinting strength of 1770, a neutral tone, a tint efficiency of 99.0 percent, a pKa value of +6.8, +4.0, improved dispersion and paint performance, and a homogeneous dense hydrous metal oxide coating when observed through an electronmicroscope.

EXAMPLE II

Pigmentary titanium dioxide of the same type as used in Example I is slurried in deionized water at ambient temperature to form about a 20.0 percent slurry. This pigment is given a hydrous oxide coating of titanium and aluminum similar to that of Example I by adding titanium tetrachloride and aluminum sulfate to the slurry, heating the slurry to 85° C. in about 1 hour and neutralizing the acidic slurry with sodium hydroxide. The resulting coated pigment is found to have a pKa value of +3.3, +1.5, and a nonhomogeneous gelatinous coating of hydrous titania and alumina.

EXAMPLE III

One thousand (1,000) grams of raw unneutralized titanium dioxide is slurried in deionized water at 20° C. to form a slurry containing 25.3 percent solids. The pH of the slurry (4.7) is adjusted with dilute sulfuric acid to a pH of 2.2. Sufficient aluminum sulfate to yield a coating of 3 percent hydrous alumina, calculated as $Al_2O_3$, on the pigment was added to the slurry along with 720 grams of urea.

The slurry is heated to about 70° C. in about one hour at which point the pH of the slurry is about 3.3. Continued heating for an additional 30 minutes raised the temperature of the slurry to about 88° C. and the pH to about 4. Continued heating for an additional two hours raised the slurry temperature about about 97° C. and the pH to about 7.3. The pH of the slurry is then raised to 7.9 with 25 percent NaOH and the coated pigment recovered by filtering the slurry.

The filter cake is washed with eight displacements of water and dried overnight at about 60° C. After being fluid energy milled, the pigment properties are determined. The pigment has a tinting strength of 1720, a neutral tone, a pKa value of +6.8, +4.0, and a uniform, dense hydrous oxide coating when observed through an electronmicroscope.

EXAMPLE IV

The procedure of Example III is substantially repeated except that the pH of the slurry is adjusted from about 2.1 to 7.0 over a period of six hours and the temperature of the slurry raised from about 27° C. to about 97° C. over 3½ hours. The recovered pigment has a pKa value of +6.8, +4.0, and a homogeneous, dense hydrous oxide coating.

EXAMPLE V

The procedure of Example I is substantially repeated except that the pH of the slurry is adjusted from about 1.5 to about 5.0 over a period of about 8½ hours and the temperature of the slurry raised from about 33° C. to about 96° C. over 1¼ hours. The recovered pigment has a pKa value of +6.8, +4.0 and a uniform, dense hydrous oxide coating.

EXAMPLE VI

The procedure of Example I is substantially repeated except that the pigment is given a hydrous metal oxide coating of hydrous alumina, hydrous titania and hydrous silica. The pH of the slurry is adjusted from about 1.5 to about 6.0 over about ten hours and the slurry temperature is raised from about 26° C. to about 93° C. in about two hours. The recovered pigment has a pKa value of +6.8, +4.0, a tint efficiency of 99 percent and a homogeneous, dense hydrous oxide coating.

EXAMPLE VII

Two hundred (200) grams of a paper grade silica pigment ($SiO_2$) containing about 4 percent CaO is slurried in one liter of deionized water. The pH of the slurry is lowered to about 3.5 with dilute sulfuric acid. Seven (7) grams of titanium tetrachloride are added to the slurry along with 40 grams of urea and the slurry heated from ambient temperature (about 25° C.) to boiling over a period of about 1½ hours. The pH of the slurry rises slowly until reaching a pH of 5.5 when the pH is adjusted with dilute NaOH to about 7. The coated pigment is recovered by filtering the slurry. The filter cake is washed with water and dried overnight. The pigment produced has a neutral pKa, i.e., +6.8, +4.0, a homogeneous, dense coating of hydrous titania, and exhibits improved opacity when tested in paper.

The data of Examples I–VII show that pigments having homogeneous, dense coatings and a neutral surface can be prepared by slowly adjusting the pH of the pigment slurry during coating of the pigment with hydrous metal oxides by generating therein a weak acid or weak base.

While this invention has been described by reference to specific details of certain embodiments, it will be understood that the invention is not intended to be construed as limited to such details except insofar as they are included in the appended claims.

We claim:

1. In the process of coating the surface of pigmentary metal oxide with hydrous metal oxide wherein the pH of an aqueous slurry containing said pigment and hydrolyzable metal compound is adjusted, the improvement which comprises adjusting the slurry pH by generating in situ a member selected from the group consisting of a weak acid and a weak base and recovering metal oxide having a homogeneous hydrous metal oxide coating.

2. A process according to claim 1 wherein the pigmentary metal oxide is titanium dioxide.

3. The process of claim 2 wherein the titanium dioxide is coated with hydrous oxide of at least one metal selected from the group consisting of titanium, aluminum and silicon.

4. The process of claim 1 wherein the aqueous slurry before adjustment is acidic.

5. The process of claim 1 wherein the pH of the aqueous slurry is adjusted by the hydrolysis of urea.

6. The proces of claim 1 wherein the slurry pH is adjusted over a period greater than 45 minutes.

7. In the proces of coating the surface of pigmentary titanium dioxide with hydrous metal oxide wherein the pH of an aqueous slurry containing said pigment and hydrolyzable metal compound is adjusted, the improvement which comprises slowly adjusting the slurry pH by hydrolyzing in situ a compound that hydrolyzes to generate a member selected from the group consisting of a weak acid and a weak base and recovering titanium dioxide having a homogeneous hydrous metal oxide coating.

8. The process of claim 7 wherein the compound that hydrolyzes to generate a member selected from the group consisting of a weak acid and a weak base has a hydrolysis constant of less than about 0.5.

9. The process of claim 8 wherein the compound that hydrolyzes to generate a member selected from the group consisting of a weak acid and a weak base is urea.

10. The process of claim 9 wherein the hydrolysis of urea is assisted by heating the slurry to from 60° C. to 100° C.

11. In the process of coating the surface of pigmentary titanium dioxide with hydrous metal oxide wherein the pH of an aqueous slurry containing said pigment and at least one hydrolyzable metal compound selected from the group consisting of hydrolyzable compounds of aluminum, silicon and titanium is adjusted, the improvement with comprises adjusting the slurry pH with urea and recovering titanium dioxide having a homogeneous hydrous metal oxide coating.

12. The process of claim 11 wherein the slurry pH is adjusted over a period of from 1 to 10 hours.

13. The process of claim 12 wherein the rate of change of pH with time, in hours, ranges from about 0.35 to about 2.0.

14. The process of claim 13 wherein the recovered titanium dioxide has a pKa of +6.8, +4.0.

No references cited.

TOBIAS E. LEVOW, Primary Examiner

H. M. S. SNEED, Assistant Examiner

U.S. Cl. X.R.

106—288, 296, 297, 299, 300, 303, 304, 306, 309